United States Patent
Memery

[15] 3,652,139
[45] Mar. 28, 1972

[54] VIBRATION DAMPING APPARATUS
[72] Inventor: James P. Memery, Manchester, Conn.
[73] Assignee: United Aircraft Corporation, East Hartford, Conn.
[22] Filed: May 27, 1970
[21] Appl. No.: 40,989

Related U.S. Application Data
[63] Continuation-in-part of Ser. No. 886,923, Dec. 22, 1969, abandoned.

[52] U.S. Cl. ............................................................308/187
[51] Int. Cl. ...............................................................F16c 39/04
[58] Field of Search ..............................308/187, 9, 35, 184

[56] References Cited

UNITED STATES PATENTS

| | | |
|---|---|---|
| 656,310 | 8/1909 | Warburton ..............................308/9 |
| 3,158,413 | 11/1964 | Shelley ...................................308/35 |
| 3,456,992 | 9/1969 | Kulina ......................................308/9 |
| 3,357,757 | 12/1967 | Moreley et al.........................308/184 |

Primary Examiner—Martin P. Schwadron
Assistant Examiner—Frank Susko
Attorney—Charles A. Warren

[57] ABSTRACT

A bearing and support assembly for a rotating shaft, such as a gas turbine engine rotor utilizes a damper construction employing a hydrodynamic film of oil in a relatively large clearance space, and the assembly includes means for controlling, metering and sealing the flow of oil through the damper construction and for preventing any rotation of the damper construction.

10 Claims, 3 Drawing Figures

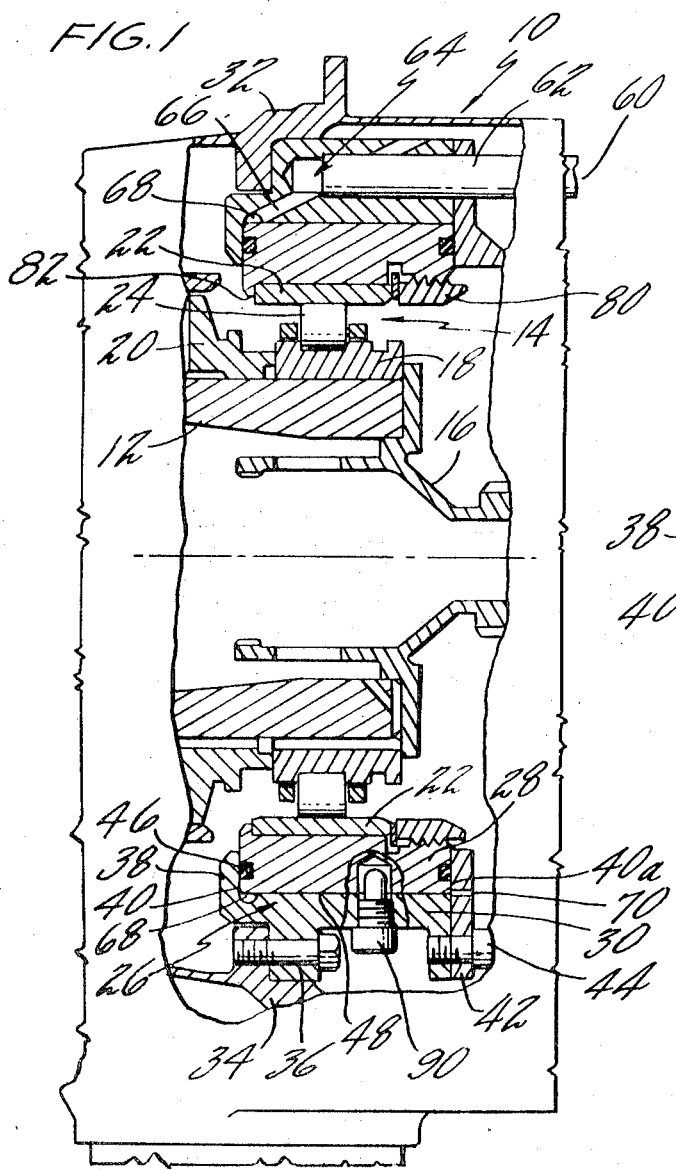
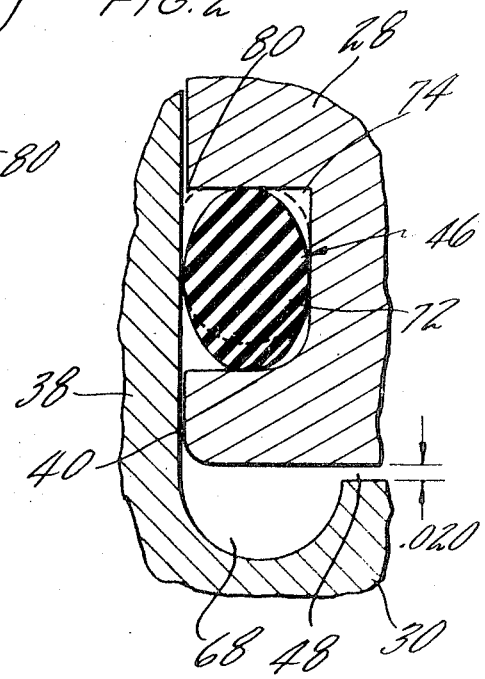
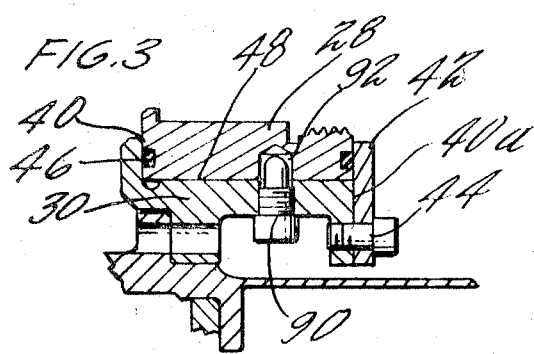
FIG. 1
FIG. 2
FIG. 3
INVENTOR
JAMES P. MEMERY
ATTORNEY

VIBRATION DAMPING APPARATUS

This is a continuation-in-part of applicant's copending Ser. No. 886,923, filed Dec. 22, 1969, now abandoned.

BACKGROUND OF THE INVENTION

The present invention relates to the support of a rotating member, and more particularly to an apparatus for altering the critical speed of a rotating member while simultaneously damping the whirl amplitude of the member, and thereby reducing the vibratory amplitude of the support.

The critical speed of a rotating system is determined by the elasticity of various members which comprise the rotating system e.g., the rotating shaft, the bearings which support the rotating shaft, and the pedestal upon which the bearings are mounted. While it will be appreciated that the critical speed can be changed by varying the elasticity of any of these component members, in actual practice the elasticity of the system is determined at the time of the design of the system and the goal has been to maintain the first critical speed of the shaft above the anticipated operating range.

In the rotating shafts in a gas turbine engine, it has become common practice to use a squeeze-film dashpot in the bearings of the shaft support system. However, in operation, these prior art squeeze film dampers still retain the original stiff bearing construction and hence retain the original critical speed characteristics. In effect, these prior art damping devices actually damp the critical speed amplitude while having substantially little effect on moving the critical frequency of the rotating shaft out of the operating range.

As has been hereinbefore noted, the prior art squeeze film dampers are basically of the type that utilize stiff spring rates with small radial gaps. More specifically, the prior art damper constructions, to maintain a stiff bearing construction, employ a damper wherein the oil film is contained in a radial gap generally on the magnitude of 0.002 to 0.004 inch. Several significant problems are encountered when these type dampers are employed in gas turbine engine applications. More specifically, rotating shafts in gas turbines are required to operate at high temperatures with oil of low viscosity. Oil, which is trapped in the relatively small radial gap of 0.002 to 0.004 inch has a tendency to coke and form a varnish buildup with a resultant reduction in damper efficiency. In actual engine operation, this coking and varnish buildup occur primarily at hot operating times in the engine such as at engine shutdown and takeoff and transient conditions. Finally, since the radial gap is so small, the passage is easily clogged either by coke deposits or other impurities carried by the oil so that no damping occurs with the result that severe vibrations would occur at the critical speed, necessitating a shutdown of the engine.

SUMMARY OF THE INVENTION

The primary object of the present invention is to provide a bearing and support apparatus which controls the critical speed of a rotating member while simultaneously damping the rotor.

The above object is accomplished principally through the mechanism of taking advantage of two coefficients, i.e., the damping coefficient and the effective spring rate coefficient. The coefficient that is critical to the construction of the present invention is the effective oil spring rate coefficient, for it is this coefficient which alters the critical speed of the rotating member to place it above design speed, or below the design speed in a transient area. More specifically, it has been found that in the bearing and support structure hereinafter described, it is critical to have a diametrical clearance in the damper construction of about at least 0.01 inch. In other words, the diametrical clearance wherein the hydrodynamic oil film is utilized, is several times greater than that used in prior art constructions at least on the order of five or more times greater. As a result of this relatively large gap, the effective spring rate of the oil is lowered and the critical speed of the rotating member is altered to a more acceptable speed. It will be appreciated that while the effective spring rate of the oil is nonlinear, this is immaterial so long as the instantaneous spring rate causes the critical speed to be significantly below or above the operating speed of the shaft.

As a result of the damper construction utilizing this large diametrical gap, the present invention required a unique flow metering and sealing arrangement. More specifically, when applied to a gas turbine engine, two flow metering or restricting means are necessary. One, a flow restriction is necessary in the oil supply line to limit the total amount of oil flowing into the damper construction. This is a safety feature and protects against the possibility of the total oil flow supplied to a given area flowing through the damper construction. Secondly, a flow metering means is positioned downstream of the radial gap in the damper. The purpose of this orifice is to control the amount of oil flowing through the damper gap. In this particular embodiment the flow metering means is an orifice the size of which is calculated as a function of the work done by the damper, the temperature rise in the oil and the amount of oil flow necessary to remove this heat and keep the damping oil at an acceptable temperature.

The seal construction hereinbefore noted is unique in that in the present embodiment it comprises an O-ring that fits relatively loosely in a cooperating slot. What is meant by "relatively loosely" is that the O-ring has an axial pinch on it of from 0–15 percent of the cross-sectional diameter of the O-ring. This is relatively loose in that most O-rings have an axial pinch of up to 40 percent of their cross-sectional diameter, the O-ring actually being in compression. The O-rings of the present invention assist in restricting the oil flow through the damper construction to a reasonable level by sealing radially two cooperating flanges in the damper construction.

One advantage heretofore not mentioned that the present invention provides by utilizing a large diametrical gap, is its ability to resist or limit coking or varnish buildup in the passage. More specifically, the present invention employs a flow path wherein there is a cross flow through the passage and hence through the damper construction. As a result of the oil flowing through is constantly washing the surface and additionally providing a more effective cooling medium. It will also be appreciated that by using a construction as disclosed herein, a certain amount of coking can occur without any adverse effect to the damper system, this not being true where a relatively small gap is employed.

Finally, the present invention employs a pair of radial pins, spaced 180° apart which prevent any rotational movement of the damper construction. This is extremely important because if rotation occurs the load carrying capacity of the damper would be materially reduced. It has been found that two pins, diametrically opposed, are optimum and these pins while preventing rotational movement should permit some eccentric oscillatory movement.

BRIEF DESCRIPTION OF THE DRAWINGS

FIG. 1 is a broken away sectional view of the invention in a gas turbine engine environment.

FIG. 2 is an enlarged view of the sealing construction of the present invention.

FIG. 3 is an enlarged view of the radial pin construction of the present invention.

DESCRIPTION OF THE PREFERRED EMBODIMENT

Referring to FIG. 1, a bearing and support construction 10 particularly adapted for use in a gas turbine engine, not shown herein, is illustrated. As shown, a rotatable shaft 12, forming part of a rotor of a gas turbine, not shown, is journaled in bearing 14. Shaft 12 has a flanged member 16 mounted thereon which engages one end of inner race 18 of bearing 14, while positioned at the forward end of inner race 18 is a ring member 20 fixed on the shaft. Ring member 20 and flange member 16 cooperate to secure inner race 18 in position on the shaft.

Bearing 14 has an outer race 22 and an assembly of rollers 24 which are located between and in rolling contact with the opposed races 18 and 22 respectively. Outer race 22 is positioned within damper construction 26 such that outer race 22 is prevented from rotating.

The damper construction 26 of the present invention is unique and comprises an inner ring 28 and an outer ring 30. Outer ring 30 is positioned in the fixed structure 32 of the engine casing and is secured therein as by one or more bolts 36. Outer ring 30 includes an inwardly projecting flange 38 at one end which overlies and is spaced slightly from one end of inner ring 28 forming a radial clearance or passageway 40 more clearly shown in FIG. 2. Positioned at the other end of inner ring 28 is a disc 42 the inner edge of which extends over the end of the inner ring. This disc 42 is secured to outer ring 30 as at 44 and is spaced from inner ring 28 to form another radial clearance or passageway 40a. Radial passageways 40 and 40' are sealed by seals 46 hereinafter described.

Outer ring 30 is spaced radially from inner race 28 and forms an annular flow passage 48. The physical dimensions of passage 48 and the communicating passageways 40 and 40' are critical to the operation of the damper construction of the present invention. More specifically, passage 48 must have a relatively large diametrical gap on the order of not less than about 0.01 inch and frequently much larger for example at least as great as 0.025 inch. In this instance, diametrical gap is defined as the total circumferential tolerance existing between inner race 28 and outer race 30. More particularly, if in the free assembly state one side of passage 48 has zero clearance, the other side of passage 48 is to have a clearance of at least 0.010 inch. As hereinbefore described, unless a diametrical gap of this magnitude is utilized effective spring rate of the oil flowing through passageway 48 will be insufficient to effectively alter the critical speed of shaft 12.

It should also be appreciated that the operation of seal construction 46 upon radial passageways 40 and 40' should be such as to prevent any flow therethrough, thus causing the oil to flow through passage 48 as metered by orifice 70. As a result of this, damper 26 is forced to approach the characteristics of an infinite journal bearing, that is, a bearing with no axial flow, even though a large radial gap is employed for passage 48. It will be appreciated that, while the passage gap 48 is relatively large, the oil film supplied thereto will form a hydrodynamic film and hence damp the whirl amplitude of shaft 12. It should be clear, therefore, that the damper construction 26 disclosed herein simultaneously controls the whirl frequency of shaft 12 and damps the vibratory amplitude transmitted to the feel structure.

As hereinbefore mentioned, a hydrodynamic film of oil is formed in passage 48. The oil flow path in the bearing and support construction of the present invention is as described hereafter. Oil is supplied to inlet means 60 which includes flow passageway 62. Positioned within flow passageway 62 is a flow restriction means 66, the purpose of which is to limit the amount of flow entering the damper structure. This is of importance in a gas turbine engine for if there is a bearing failure or such, the entire engine oil supply would not be lost therethrough.

The oil proceeds through oil restriction 66 from passageway 62 and into annulus 68. Annulus 68 is positioned at the forward or upstream end of damper construction 26 and is in communication with radial passageway 40 and passage 48. The oil therefore proceeds from annulus 68 into passage 48 and flows in crossflow direction through damper construction 26. More specifically, the oil flows from the upstream end of the damper to the downstream end of the damper prior to being discharged through flow metering means 70. Flow metering means 70 is a fixed diameter orifice and controls the amount of flow through passage 48 to that required for thermal stability.

As above stated, the diametrical clearance is much greater than in the prior art, and it replaces the flexibility normally incorporated in the mechanical support structure for the bearing. That is to say, where the damper clearance is small, the damper serves to damp minor vibrations occurring in the system and the greater vibrations such as those occurring at critical speeds must be separately absorbed by mechanical flexibility external to the bearing and oil damper. On the contrary, the thicker film of oil of the present invention serves effectively to damp the movements of the rotating shaft in its eccentric movement by reason of unbalance in the shaft. Such unbalances inevitably exist and cause an orbital movement of the centerline of the shaft about its normal operating position, this orbital movement occurring at the same rate as the speed of rotation of the shaft. To damp effectively one particular bearing the damper clearance was selected as from 0.022 to 0.025 inches for a diameter of 4¾ inch and a face dimension for the damper rings of 1½ inch.

To determine the radial gap for the damper it is preferable that the attitude of the bearing be no greater than 0.8 and preferably larger than 0.5. This attitude is the amount of radial eccentricity permissible divided by the normal radial gap in the damper.

The diametrical clearance between inner and outer damper races is critical to the determination of the effective spring rate provided by the hydrodynamic film, which in the present construction requires a diametrical clearance approximately three or more times larger than prior art constructions, and which spring rate substantially reduces the pedestal stiffness of the rotating structure, thereby altering the frequency of the system.

The effective spring rate is created by the hydrodynamic film reaction forces that result when the inner race is deflected from its previous operating position. Since the new position is a function of whirl frequency, input load, damper gap, viscosity, L/D ratio, and crossflow, the effective spring rate is extremely nonlinear, but this is of little consequence, so long as the average spring rate is less than the critical value required to maintain the critical frequency at a point outside the normal operating range of the rotor.

As hereinbefore noted, seal constructions 46 seal the radial passageways 40 and 40' existing between flange 38 and inner ring 28 and between ring 28 and disc 42. Each seal construction 46 comprises an O-ring 72 positioned in circumferential groove 74 in inner ring 28. The arrangement is unique in that O-ring 72 is positioned to minimize compressive pinch and has therefore been termed herein as being "axially loose." More specifically, the axial pinch or compression on O-ring 72 between flanges 38 and 44 is in the range of 0–15 percent of the cross-sectional diameter of O-ring 72 while a gap of 0.002 to 0.006 inch is maintained in radial passageways 40 and 40'.

The requirement of a substantially axially loose seal construction is critical because it permits operation of the resilient member or O-ring at elevated temperatures. More specifically, operation of the resilient member or O-ring has been demonstrated at 450° F. without any permanent plastic deformation occurring to the O-ring. This is normally what occurs to O-rings in this temperature range, especially after engine shutdown. The seal construction of the present invention avoids this problem because the minimal axial pinch minimizes O-ring deformation during this period.

As has been hereinbefore stated, the seal construction essentially prevents leakage; however, as the oil pressure in annulus 68 increases, the pressure distribution of the oil across the back side of the O-ring is such as to push the O-ring into corner 80. The shape and position of the O-ring as a result of this pressure distribution is more clearly shown in FIG. 2, the dotted lines therein illustrating the sealing position of the O-ring.

As has hereinbefore been stated, the outer ring 30 and the inner ring 28 of the damper are locked against any rotational movement. Additionally, the outer race 22 of bearing 14 is fixedly secured to the inner ring 28 by locking means 80 and shoulder 82. Therefore, in this embodiment of the invention the outer race 22 and the inner ring 28 and the outer ring 30 of the damper are all fixed against rotation.

The antirotational construction comprises a pair of diametrically opposed radially extending pins 90 located in outer ring 30 and spaced 180° from one another extend loosely into openings 92 in the inner ring 28 to lock the inner and outer ring 28 and 30 together. While pin 90 prevents rotational movement, it has been determined that the damper construction 26 and bearing outer race 22 should be permitted to oscillate eccentrically. To accomplish this, it is necessary that a gap is provided between the radial pins 90 and the cooperating openings 92 in the damper construction. A preferred gap therebetween has been determined to be in the range of 0.060 to 0.100 inch.

FIG. 3 clearly illustrates the radial pin arrangement. It will be appreciated that while only one pin 90 is illustrated that another one is utilized, this one being spaced 180° therefrom.

I claim:

1. Apparatus for damping vibrations of a rotating shaft comprising a shaft a support means for the shaft, a bearing between the shaft and the support means, the bearing having at least an outer race wherein the improvement comprises;

means for supplying oil to the apparatus, the means including flow means for conducting the oil throughout the apparatus;

a damper construction including an inner ring and an outer ring, the inner ring being secured to the bearing outer race, the outer and inner rings being spaced apart radially to form a passage therebetween to maintain a hydrodynamic film of oil, said passage having a diametrical clearance of at least 0.010 inch thereby taking advantage of the effective spring rate of the film of oil.

2. Apparatus for damping vibrations of a rotating shaft as in claim 1 including;

a flow restricting means in the oil supplying means, this restriction limiting the total amount of oil that can flow through the damper construction;

a flow metering means positioned downstream of the passage, the flow metering means controlling the amount of flow through the passage.

3. Apparatus for damping vibrations of a rotating shaft as in claim 1 including;

one of said rings having an annular groove therein said groove being in communication with the oil supply means and the passage, these rings cooperating to form a crossflow path for the oil through the damper construction.

4. A bearing and support construction for damping vibrations of a rotating shaft within a fixed support structure, comprising a support structure, a shaft and a bearing between the shaft and support structure and having opposed races which are supported by the shaft and support structure, wherein the improvement comprises;

a damper construction including an inner ring and an outer ring, one of said rings being in contact with one of the said races, said rings being spaced apart radially to form a passage therebetween, and means for supplying oil to said passage for maintaining a hydrodynamic film of oil in the passage the latter having a diametrical clearance of at least 0.010 inch.

5. A bearing and support construction as in claim 4 including a seal construction positioned in a peripheral slot formed between the end of one ring and an overlying projecting flange on the other ring, the seal construction being a loose fit in the slot at assembly, and sealing radially in said slot to prevent any oil flow radially through the slot.

6. A construction as in claim 5 including flow metering means for controlling the flow of oil through the damper construction.

7. A bearing and support construction as in claim 5 wherein; the seal construction includes an O-ring seated loosely in the slot so that there is substantially no axial pinch on the O-ring at assembly.

8. A bearing and support construction as in claim 5 wherein; the width of said slot is in the range of 0.002 to 0.006 inch.

9. A bearing and support construction for damping vibrations of a rotating shaft within a support structure comprising a bearing having an inner and outer race which are supported by the shaft and support structure, wherein the improvement comprises;

a damper including inner and outer rings, the inner ring being in contact with the outer race, the races being spaced apart to form a passage therebetween and means for supplying oil to said damper for forming a hydrodynamic film of oil in said passage, the latter having a diametrical opening of at least 0.010 inch;

antirotational means for the damper rings including a pair of diametrically opposed pins in one of said rings and extending into openings in the other ring; and flow metering means for controlling the flow of oil through the damper.

10. A bearing and support construction as in claim 9 wherein;

the pins are fixed in and extend substantially radially through one ring and have a loose fit within a cooperating opening in the other ring.

* * * * *